United States Patent [19]
Bombardier

[11] 3,774,803
[45] Nov. 27, 1973

[54] FUEL TANK AIR VENT LINE
[75] Inventor: Jerome Bombardier, Valcourt, Quebec, Canada
[73] Assignee: Bombardier Limited, Valcourt, Quebec, Canada
[22] Filed: Sept. 18, 1972
[21] Appl. No.: 289,845

[52] U.S. Cl. .................................. 220/85, 280/5
[51] Int. Cl. .............................................. B65d 25/00
[58] Field of Search ............ 220/85 F, 85 S, 85 VR, 220/85 VS, 86 R, DIG. 27, 44 R; 280/5 A, 5 R

[56] References Cited
UNITED STATES PATENTS
2,404,765    7/1946    Valentyne ............................ 280/5 A
3,244,314    4/1966    Fisher ................................ 220/44 R Primary Examiner—George E. Lowrance
Assistant Examiner—Steven M. Pollard
Attorney—Roberts B. Larson et al.

[57] ABSTRACT

An air vent line for use with a snowmobile fuel storage tank is shaped so as to have at all times a portion thereof vertically extending above the tank's fuel level for any of the non-horizontal positions in which the snowmobile may normally be when in use or while being stored. As a result, fuel leakage occurrences are greatly reduced.

6 Claims, 10 Drawing Figures

PATENTED NOV 27 1973 3,774,803

PATENTED NOV 27 1973 3,774,803

FUEL TANK AIR VENT LINE

This invention relates to a fuel storage tank for use in a snowmobile; more particularly, the invention pertains to a snowmobile fuel storage tank with an air vent system.

The fuel storage tank in most snowmobiles is located at the front end thereof underneath the hood. The air venting system usually associated with this storage tank and required for allowing an even flow of fuel to the engine, consists in providing a small orifice through the tank cap; this orifice enables a free expansion and contraction of the air and vapour in the space above the fuel level.

Snowmobiles, being winter sport vehicles, are stored during the other seasons in garages or in other restricted locations and, to reduce storage area, they are usually stored sideways. However, snowmobiles are frequently stored with full or partially filled tanks resulting in fuel leakage through the cap orifice. Similarly, if during use the snowmobile is maintained a sufficient long time in a non-horizontal position, fuel spill may occur causing a fire hazard when the engine is running.

Some devices have been devised to overcome this problem, one of which consists in a bib which surrounds the neck of the tank fuel inlet and which collects fuel drippings which are then drained outside the engine section of the snowmobile. However, this device does not overcome the problem of fuel leakage when the snowmobile is stored.

It is an object of the present invention to provide on a snowmobile fuel storage tank an air vent tube which has a portion vertically extending above the fuel level inside the tank independently of the tilted positions normally expected from a snowmobile whether stored or in use.

The present invention therefore relates to a snowmobile fuel storage tank comprising, in combination: top, bottom and opposite side walls defining a closed chamber; fuel inlet and outlet means on the top wall; air vent means extending through this top wall and including a tube having one open end inside the chamber and the other open end outside the chamber in communication with the atmosphere; this tube has a first portion extending from the top wall to beyond a first plane including one side wall, a second portion extending across the chamber from this side wall to its opposite side wall and a third portion extending beyond a second plane which includes the opposite side wall.

In one embodiment of the invention, the third portion of the tube extends to beyond a third plane that includes the rear wall of the chamber. This enables the snowmobile to be stored or positioned in a frontwardly or "nose down" position.

Other features and advantages of the fuel storage tank according to this invention will appear more clearly from the following description of illustrative embodiments shown on the accompanying drawings wherein like reference numerals refer to like or corresponding parts throughout. In the drawings.

Figure 1:
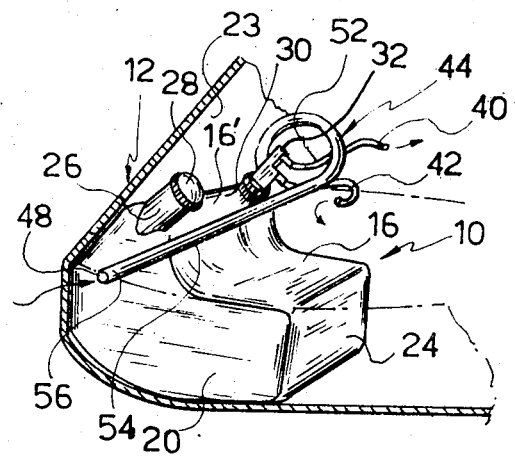
FIG. 1 is a side perspective view of one embodiment of a fuel storage tank made in accordance with the present invention, positioned within the partially shown hood of a snowmobile.

Referring to FIG. 1, there is shown a fuel storage tank 10 which is shown positioned within the hood 12 (shown partially) mounted at the front end of a snowmobile (not shown). Most snowmobile fuel tanks consist of a generally rectangular shaped body made from a rigid plastic material and formed of bottom wall 14, top wall 16, side walls 18 and 20, front wall 22 and rear wall 24. These walls vary in shape and are made to occupy the maximum volume available under the hood of the snowmobile. As an example, tank 10 shown in the figures includes an elevated portion 16' adjacent the front wall 22 of the tank; walls 22 and 16' adopt the shape of the inner surface 23 of the hood. The walls cooperate with each other to define a closed chamber of predetermined size in which fuel is contained. Thus, the structure of the tank shown corresponds generally to the structure of conventional fuel storage tanks now commercially available and utilized for containing fuel in a snowmobile.

Figure 2:
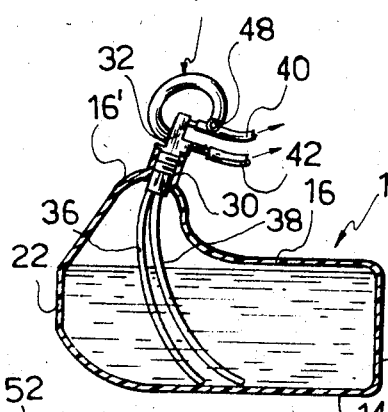
FIG. 2 is a side cross-sectional view of the fuel storage tank illustrated in FIG. 1.
Figure 3:
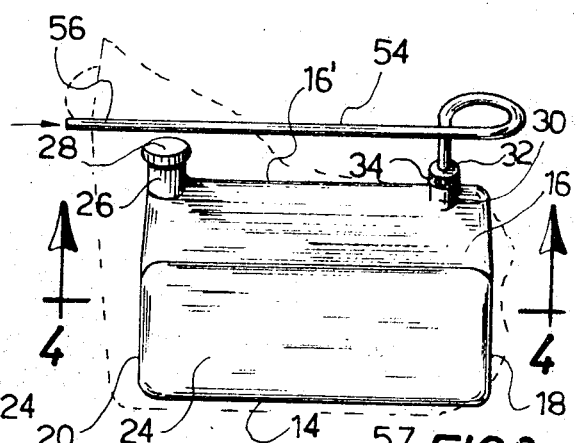
FIG. 3 is a rear elevational view of the fuel storage tank made in accordance with the present invention.

On the elevated portion 16' of the top wall, there is provided a fuel inlet means consisting of a neck extension 26 covered by a cap 28. Also provided on elevated portion 16', is a fuel outlet means which include a neck extension 30 in which is received a connecting member 32 fixedly secured therein by means of a clamp 34 (see FIG. 3). The connecting member 32 joins fuel lines 36 and 38 (see FIG. 2) inside the storage tank 10 with fuel lines 40 and 42, respectively, which are connected to the carburetor (not shown) of the snowmobile engine.

In the embodiments illustrated in FIGS. 1 – 8, the connecting member 32 also secures air vent means 44 to the container 10. The air vent means include a rigid tube which has one open end 46 (see FIGS. 4 and 4a) extending inside the container 10 above the fuel level 50 and the opposite open end 48 extending outside the tank in communication with the atmosphere. The present invention is concerned with shaping this air vent tube 44 outside the tank so that any normal tilting of the snowmobile during use or storage will not result in fuel leakage thereby causing a fire hazard.

Figure 4:
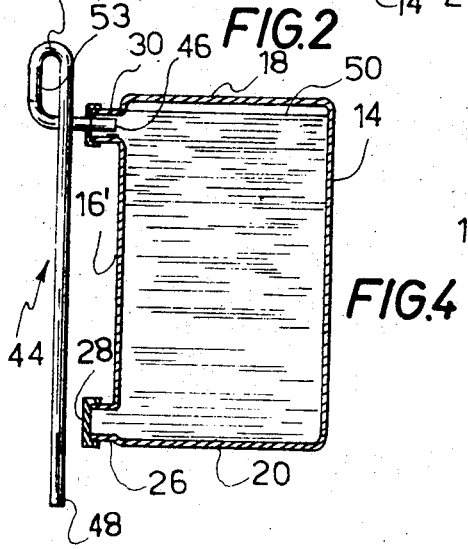
FIG. 4 is a cross-sectional view of the fuel storage tank shown being tilted 90° to the left side relative to the normal horizontal plane.
Figure 4A:
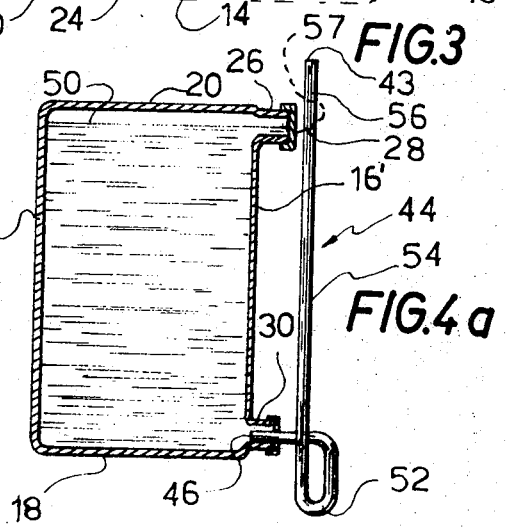
FIG. 4a is a cross-sectional view of the fuel storage tank being tilted 90° to the right side relative to the normal horizontal plane.
Figure 5:
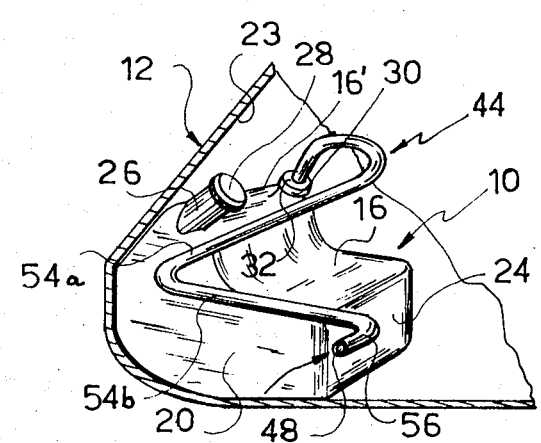
FIG. 5 is a side perspective view of another embodiment of a fuel storage tank made in accordance with the present invention.
Figure 6:
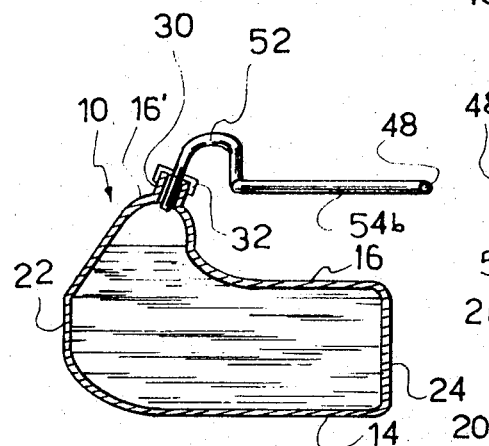
FIG. 6 is a cross-sectional view of the fuel storage tank illustrated in FIG. 5.
Figure 7:
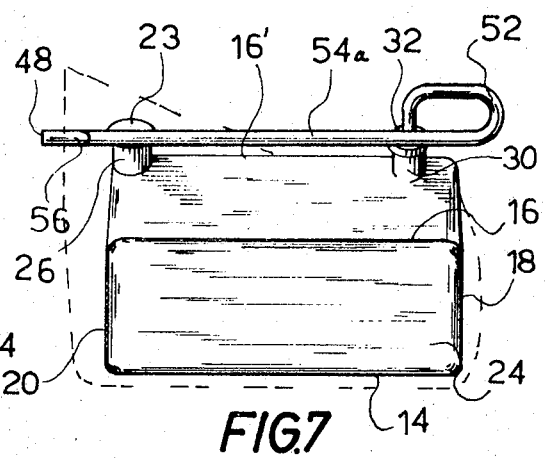
FIG. 7 is a rear elevational view of the fuel storage tank illustrated in FIG. 5.

FIGS. 4 and 4a represent the maximum sideways positions which are expected from a stored or used snowmobile. In each extreme position, tube 44 has a portion which is vertically above the fuel level 50 inside the tank. A first portion 52 extends from the outlet means 30 to beyond an imaginary plane that includes side wall 18 of the tank so that, when in position shown in FIG. 4, fuel leakage is prevented since the fuel level in portion 52 is at 53. Subsequently, as the snowmobile is returned to its normal horizontal position, the fuel in portion 52 is returned to the tank 10 under gravity. In the position shown in FIG. 4a, fuel leakage is also prevented since the air vent tube 44 includes a second portion 56 which extends beyond the imaginary plane which includes side wall 20 and the fuel level in portion 56 is at 57. When the snowmobile is returned to the horizontal position, fuel in portion 56 is returned to the tank under gravity. Portion 54 extends between end portions 52 and 56 and, preferably, should extend above top wall 16 or its elevated portion 16'.

Figure 8:
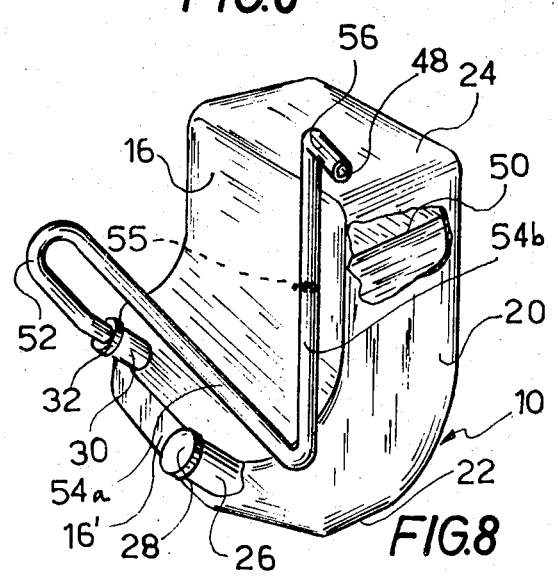
FIG. 8 is a side perspective view showing the fuel storage tank of FIG. 5 tilted 90° frontwardly relative to the normal horizontal position.

FIGS. 5 – 8 represent a similarly constructed fuel storage tank 10 but illustrate another embodiment of tube 44. In this particular embodiment, portion 54 of the tube includes two bent portions 54a and 54b. Portion 54b extends along and beyond side wall 20 to reach end portion 56 which extends beyond a plane that includes rear wall 24 of the tank. FIG. 8 therefore illustrates the extreme position when the snowmobile will be in a vertical position with its "nose down." In this position, there is no fuel leakage since the fuel level in portion 54b is at 55. As the snowmobile is subsequently returned to its normal horizontal position, fuel in portion 54b is returned in the tank under gravity.

It can be seen that, because neck 30 is adjacent the front end wall 22 of the tank, fuel spill is prevented when the snowmobile is in a "nose up" slightly inclined position. In the extreme case, where the snowmobile would be stored in a vertical position (not shown in the drawings), it will only suffice to have portion 52 of tube 44 extend from the outlet 30 frontwardly beyond a plane including front wall 22.

Figure 9:
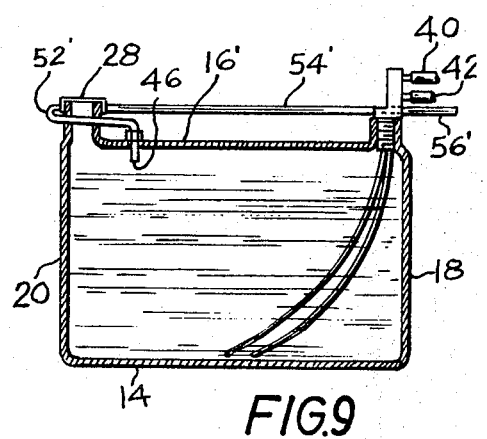
FIG. 9 is a cross-sectional view of another embodiment of the present invention illustrating the air vent tube extending directly through the top wall of the tank.

The embodiment shown in FIG. 9 is illustrated to indicate that the open end 46' of the air vent tube 44' may be inserted directly in an opening 57 appropriately provided on top 16 or its elevated portion 16' between the inlet and outlet means 26 and 30.

This tube has a first portion 52' extending from opening 57 to beyond the plane that includes side wall 20, a second portion 54' extending across the tank from wall 20 to the opposite wall 18, and a third portion 56' extending a plane that includes the side wall 18. It is evident that this embodiment could also be varied to include the embodiment illustrated in FIGS. 5 – 8.

It is therefore wished to have it understood that the present invention, although described above in relation to specific forms, can be modified and refined in various ways and is therefore not limited in interpretation except by the terms of the following claims.

What I claim is:

1. A snowmobile fuel storage tank comprising, in combination: top, bottom and opposite side walls defining a closed chamber; fuel inlet and outlet means on said top wall; air vent means extending through said top wall and including a tube having one open end inside said chamber and an opposite open end outside said chamber in communication with the atmosphere; said tube having a first portion extending from said top wall to beyond a first plane including a first side wall, a second portion extending across said chamber from said first side wall to the opposite side wall thereof, and a third portion extending beyond a second plane including said opposite side wall, whereby fuel contained in said chamber, when tilted sideways, is prevented from leaking outside said tube as a result of said tube having a portion thereof extending vertically above the fuel level inside said tilted chamber.

2. A storage tank as defined in claim 1 wherein said second portion of said tube extends above said top wall.

3. A storage tank as defined in claim 2 wherein said fuel outlet means include an opening on said top wall and connecting means for securing fuel lines in said opening; said tube extending through said opening and said connecting means securing said tube to said chamber.

4. A snowmobile fuel storage tank comprising in combination: top, bottom, front, rear, first and second side walls defining a closed chamber for receiving fuel therein; fuel inlet and outlet means on said top wall; air vent means extending through said top wall and including a tube having one open end inside said chamber and an opposite open end outside said chamber in communication with the atmosphere, said tube having a first portion extending from said top wall to beyond a first plane defined by said first side wall, a second portion extending across said chamber from said first side wall to said second side wall, and a third portion extending beyond a second plane including said second side wall and beyond a third plane including said rear wall, whereby fuel contained in said chamber, when tilted sideways or frontwardly, is prevented from leaking outside said tube as a result of said tube having a portion thereof extending vertically above the fuel level inside said tilted chamber.

5. A storage tank as defined in claim 4 wherein said second portion of said tube extends above said top wall.

6. A storage tank as defined in claim 5 wherein said fuel outlet means include an opening on said top wall and connecting means for securing fuel lines in said opening; said tube extending through said opening and said connecting means securing said tube to said chamber.

* * * * *